G. BLANK.
ELECTRICAL DISTRIBUTION SYSTEM.
APPLICATION FILED APR. 26, 1912.
1,059,925.
Patented Apr. 22, 1913.
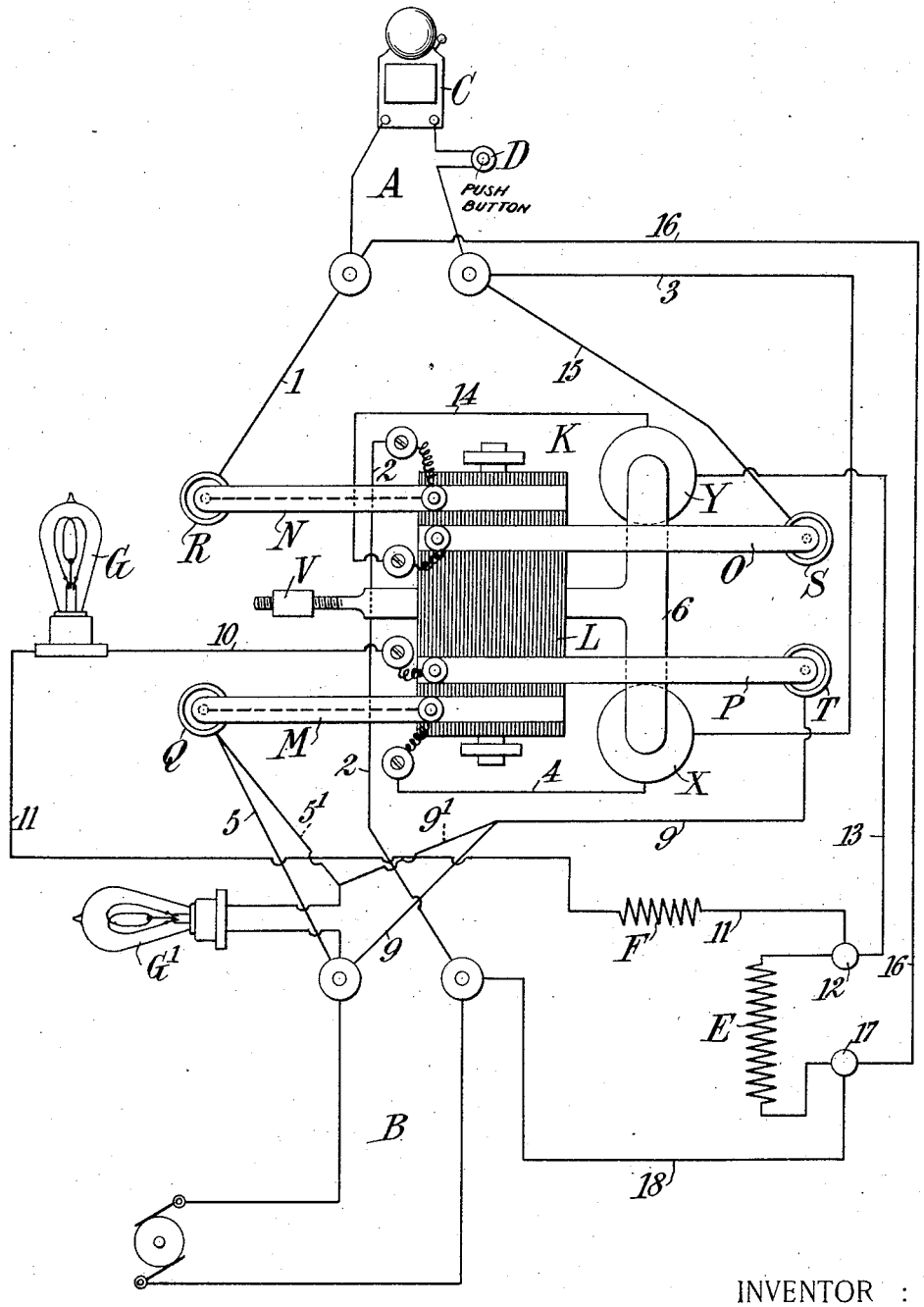
WITNESSES:
René Buine
Fred White
INVENTOR:
Gregor Blank,
By Attorneys,
Fraser Tucht Myers

UNITED STATES PATENT OFFICE.

GREGOR BLANK, OF NEW YORK, N. Y.

ELECTRICAL DISTRIBUTION SYSTEM.

1,059,925. Specification of Letters Patent. Patented Apr. 22, 1913.

Application filed April 26, 1912. Serial No. 693,320.

*To all whom it may concern:*

Be it known that I, GREGOR BLANK, residing in the borough of Manhattan, city, county, and State of New York, a subject of the King of Hungary, have invented certain new and useful Improvements in Electrical Distribution Systems, of which the following is a specification.

This invention relates to electrical distribution systems, and current reducing apparatus, and aims to provide certain improvements therein.

The present invention provides a means for utilizing the electricity of a feed circuit in a service circuit in such manner that energy of the feed circuit is transmitted to the service circuit in a modified state, as at a lower potential or of a lower current-strength, or both. It is also provided that the energy of the feed circuit is only consumed or utilized when required, and in such manner that, when energy is required in the service circuit, it is automatically supplied thereto by the mere act of closing the circuit through the device employing the electrical energy.

In house installations, for instance, where a current of small amount and low potential is required, as for ringing electric call-bells and buzzers, actuating annunciators and small motors, supplying local current to telephone apparatus or the like, current may be taken from a circuit connected with a dynamo-generator, such as an incandescent light circuit, by the use of my invention. Electric cells or batteries have heretofore been most usually employed to furnish the electrical energy in such systems. Electric cells lose their efficiency in time, require frequent attention, and require periodic replacement. They are, moreover, expensive when compared with watt-cost of other forms of electric generators. These objections incident to the employment of electric-cells and batteries are therefore avoided by the present invention.

A system embodying the principles of the present invention is illustrated diagrammatically in the accompanying drawing.

In said drawings A designates the service circuit and B the lighting circuit, for instance a circuit which is used for ordinary incandescent house-lighting. The service circuit is of the ordinary design including any suitable translating device C. This translating device may be either an ordinary call-bell, as shown, a buzzer, a horn, an annunciator, a telephone call-bell, a small motor, or any other analogous device. The service circuit is normally open, being interrupted by any suitable switch, such as a push button D.

The service circuit A is connected to the feed circuit B through a switch device K. Blades M and N of the switch device normally rest on contacts Q and R, the blades being held in position by a weight V acting upon a part L upon which the blades are mounted. In this position of the blade-carrier L no current normally passes from the feed circuit into the service circuit nor is current consumed in any part of the system. By pressing upon the push-button D, however, a circuit is established between service circuit A and the feed circuit B through conductor 1, contact R, switch-blade N and conductor 2, on one side and through conductor 3, electromagnet X, conductor 4, switch-blade M, contact Q and conductor 5 on the other side. Magnet X instantly attracts armature 6 of the blade-carrier L and throws the blades O and P against contacts S and T. Little or no current passes from the feed circuit to the service circuit before the switch device operates, because magnet X has a winding of high resistance, and furthermore the action of the magnet to break the circuit is instantaneous with the action of the push-button.

After the switch-device operates, as set out above, a circuit is established between the service circuit and feed circuit, as follows: through conductor 9, contact T, switch-blade P, conductor 10, lamp G, conductor 11, binding-post 12, conductor 13, magnet Y, conductor 14, switch-blade O, contact S and conductor 15, on one side, and on the other side through conductor 16, binding-post 17 and conductor 18. A circuit is completed over this route as long as the push-button is kept pressed. Current therefore traverses magnet Y as long as the push-button is pushed, and thereby maintains the switch blades O and P in contact with contacts S and T.

The voltage of the feed-circuit is cut down by the lamp G, so that the difference in potential in the service circuit is very much less than that in the feed circuit. The lamp is a very convenient means of cutting down the resistance as the heating takes place within the lamp and not in an exposed conductor. A lamp is also of especial advantage in this connection. By using lamps having different candle-powers the amount of current flowing from the feed circuit may be regulated in accordance with the requirements of the service circuit. A resistance coil F may be inserted in series with the lamp G, in order to additionally regulate the difference in potential in the service circuit.

In order to regulate the current in the service circuit, a shunt circuit E is placed across the service circuit preferably between the binding-posts 12 and 17. By regulating the resistance of this shunt circuit E the amount of current flowing through the service circuit may be readily regulated. Instead of arranging the lamp so that it shall be in series with the service circuit only in one position of the switch device, it may be so arranged that it will be in series therewith in both positions of the switch. For this purpose a lamp G' is placed in series with both conductors 5' and 9' leading to the contracts Q and T. The resistance of the lamp by this arrangement, may be relied upon instead of, or in addition to, the winding of magnet X, to cut down the difference of potential of the service circuit.

All parts of the installation with the exception of the feed circuit and service circuit conductors may be placed within or mounted upon an insulating and fireproof base.

The system is especially adapted for direct currents, though it can be equally as well employed with alternating currents.

Modifications can be made in the embodiment of the invention illustrated and described without departing from the spirit of the invention.

What is claimed is:—

1. An electric system comprising a normally open service circuit, a translating device in said circuit, a feed circuit having two branches, a shunt circuit, and an automatic switch, said automatic switch normally connecting one branch of said feed circuit with said service circuit, and operating to disconnect said branch from said service circuit and to connect said other branch of said feed circuit with said service and shunt circuits upon closing of the said service circuit.

2. An electric system comprising a normally open service circuit, a translating device in said circuit, a feed circuit having two branches, a shunt circuit, and automatic means normally connecting one branch of said feed circuit with said service circuit, and operating to disconnect said branch from said service circuit and to connect said other branch of said feed circuit with said service and shunt circuits upon closing of the said service circuit.

3. An electric system comprising a normally open service circuit, a translating device in said circuit, a feed circuit having two branches, a resistance in series with said feed circuit, a shunt circuit, and automatic means normally connecting one branch of said feed circuit with said service circuit, and operating to disconnect said branch from said service circuit and to connect said other branch of said feed circuit with said service and shunt circuits upon closing of said service circuit.

4. An electric system comprising a normally open service circuit, a translating device in said circuit, a feed circuit having two branches, a shunt circuit, and automatic means normally connecting one branch of said feed circuit with said service circuit, and operating to disconnect said branch from said service circuit and to connect said other branch of said feed circuit with said service and shunt circuits upon closing of said service circuit, said second branch having a resistance therein.

5. An electric system comprising a normally open service circuit, a translating device in said circuit, a feed circuit having two branches, a resistance in series with said feed circuit, a shunt circuit, and an automatic switch, said automatic switch normally connecting one branch of said feed circuit with said service circuit, and operating to disconnect said branch from said service circuit and to connect said other branch of said feed circuit with said service and shunt circuits upon closing of said service circuit.

6. An electric system comprising a normally open service circuit, a translating device in said circuit, a feed circuit having two branches, an incandescent lamp in series with said feed circuit, a shunt circuit, and automatic means normally connecting one branch of said feed circuit with said service circuit, and operating to disconnect said branch from said service circuit and to connect said other branch of said feed circuit with said service and shunt circuits upon closing of said service circuit.

7. An electric system comprising a normally open service circuit, a translating device in said circuit, a feed circuit having two branches, a resistance in series with said feed circuit, a shunt circuit, and means normally connecting one branch of said feed circuit with said service circuit, and an electromagnet adapted to operate said means to disconnect said branch from said service circuit and to connect said other branch of said feed circuit with said service and shunt circuits upon closing of said service circuit.

8. An electric system comprising a normally open service circuit, a translating device in said circuit, a feed circuit having two branches, a resistance in series with said feed cirucit, a shunt circuit, and means normally connecting one branch of said feed circuit with said service circuit, and an electromagnet of high resistance adapted to operate said means to disconnect said branch from said service circuit and to connect said other branch of said feed circuit with said service and shunt circuits upon closing of said service circuit.

9. An electric system comprising a normally open service circuit, a translating device in said circuit, a feed circuit having two branches, a resistance in series with said feed circuit, a shunt circuit, and automatic means normally connecting one branch of said feed circuit with said service circuit, and operating to disconnect said branch from said service circuit and to connect said other branch of said feed circuit with said service and shunt circuits upon closing of said service circuit, and an electromagnet adapted to retain said means in its actuated position while said service circuit remains closed.

10. An electric system comprising a normally open service circuit, a translating device in said circuit, a feed circuit having two branches, a resistance in series with said feed circuit, a shunt circuit, and automatic means normally connecting one branch of said feed circuit with said service circuit, and operating to disconnect said branch from said service circuit and to connect said other branch of said feed circuit with said service and shunt circuits upon closing of said service circuit, and means for returning said automatic means to initial position upon opening of said service circuit.

11. An electric system comprising a normally open service circuit, a translating device in said circuit, a feed circuit having two branches, a resistance in series with said feed circuit, a shunt circuit, and automatic means normally connecting one branch of said feed circuit with said service circuit, and operating to disconnect said branch from said service circuit and to connect said other branch of said feed circuit with said service and shunt circuits upon closing of said service circuit, an electromagnet adapted to retain said means in its actuated position while said service circuit remains closed, and means for returning said automatic means to initial position upon opening of said service circuit.

12. An electric system comprising a normally open service circuit, a translating device in said circuit, a feed circuit having two branches, a shunt circuit, a switch normally connecting one branch of said feed circuit with said service circuit, an electromagnet in said branch adapted to operate said switch to disconnect said branch from said service circuit, and to connect said other branch of said feed circuit with said service and shunt circuits upon closing of said service circuit, and an electromagnet in said other branch adapted to retain said switch in operated position while said service circuit remains closed.

13. An electric system comprising a normally open service circuit, a translating device in said circuit, a feed circuit having two branches, a resistance in series with said feed circuit, a shunt circuit, a switch normally connecting one branch of said feed circuit with said service circuit, an electromagnet in said branch adapted to operate said switch to disconnect said branch from said service circuit, and to connect said other branch of said feed circuit with said service and shunt circuits upon closing of said service circuit, and an electromagnet in said other branch adapted to retain said switch in operated position while said service circuit remains closed.

In witnesses whereof, I have hereunto signed my name in the presence of two subscribing witnesses.

GREGOR BLANK.

Witnesses:
　ARTHUR C. PATTON,
　FRED WHITE.

---

Copies of this patent may be obtained for five cents each, by addressing the "Commissioner of Patents, Washington, D. C."